United States Patent
Chao

(10) Patent No.: US 11,599,581 B2
(45) Date of Patent: Mar. 7, 2023

(54) CONTENT ACCESS AND STORAGE

(71) Applicant: Piksel, Inc., Wilmington, DE (US)

(72) Inventor: Gerald Chao, Los Angeles, CA (US)

(73) Assignee: PRJ HOLDING COMPANY, LLC, Wilmington, DE (US)

(*) Notice: Subject to any disclaimer, the term of this patent is extended or adjusted under 35 U.S.C. 154(b) by 498 days.

(21) Appl. No.: 16/616,921

(22) PCT Filed: May 25, 2018

(86) PCT No.: PCT/US2018/034715
§ 371 (c)(1),
(2) Date: Nov. 25, 2019

(87) PCT Pub. No.: WO2018/218184
PCT Pub. Date: Nov. 29, 2018

(65) Prior Publication Data
US 2020/0159773 A1     May 21, 2020

Related U.S. Application Data

(60) Provisional application No. 62/511,161, filed on May 25, 2017.

(51) Int. Cl.
| | | |
|---|---|---|
| G06F 16/00 | (2019.01) | |
| G06F 16/907 | (2019.01) | |
| G06F 16/9038 | (2019.01) | |
| G06F 16/9032 | (2019.01) | |
| G06F 40/295 | (2020.01) | |
| G06F 40/30 | (2020.01) | |

(Continued)

(52) U.S. Cl.
CPC ........ *G06F 16/907* (2019.01); *G06F 16/9038* (2019.01); *G06F 16/90332* (2019.01); *G06F 17/16* (2013.01); *G06F 40/295* (2020.01); *G06F 40/30* (2020.01); *G06K 9/6256* (2013.01)

(58) Field of Classification Search
CPC ............... G06F 16/907; G06F 16/9038; G06F 16/90332
USPC ........................................................ 707/769
See application file for complete search history.

(56) References Cited

U.S. PATENT DOCUMENTS

2016/0328388 A1* 11/2016 Cao ........................ G10L 15/16
707/707

OTHER PUBLICATIONS

International Search Report and Written Opinion, EPO, completed Jul. 24, 2018, for application PCT/US2018/034715.

* cited by examiner

*Primary Examiner* — Alexandria Y Bromell
(74) *Attorney, Agent, or Firm* — Holzer Patel Drennan

(57) ABSTRACT

A method of generating matching metadata vectors for identifying content items in a store searchable by input vectors, the method comprising: receiving multiple training inputs, each training input comprising a content identifier indicative of a content item, and at least one natural language description of the content item; for each training input: converting the natural language description into at least one text component; generating at least one vector, each vector corresponding to one text component; generating a set of component parts for each vector, each component part corresponding to a coordinate initialized with a random value; adjusting each random coordinate based on the relationship of each component part to other vectors; determining a weighting for each vector with respect to the item; and defining a metadata vector for each item comprising the vectors containing the adjusted coordinates for that item and the weighting for each vector.

20 Claims, 4 Drawing Sheets

(51) Int. Cl.
*G06F 17/16* (2006.01)
*G06K 9/62* (2022.01)

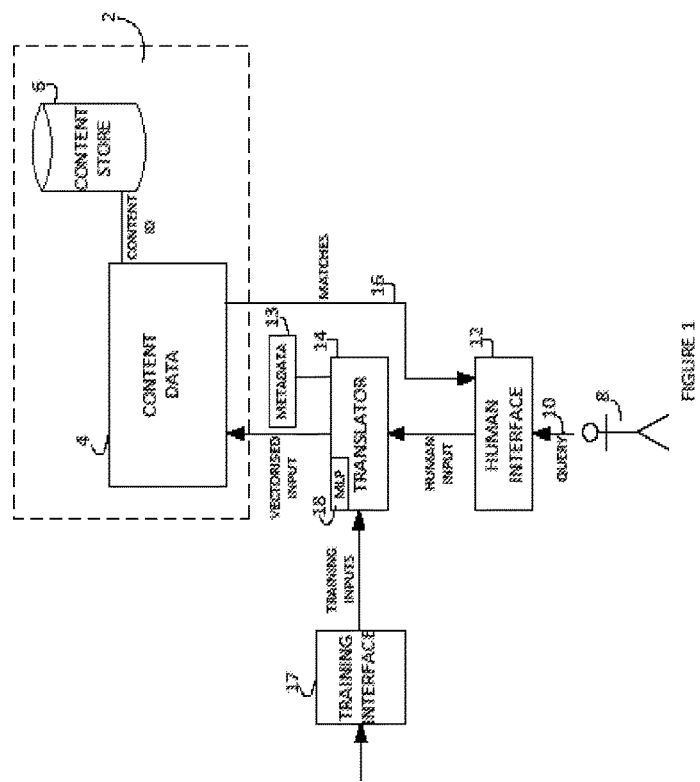
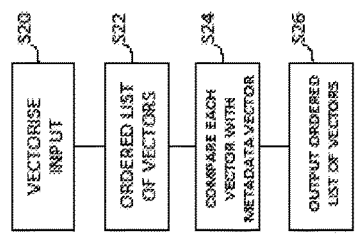

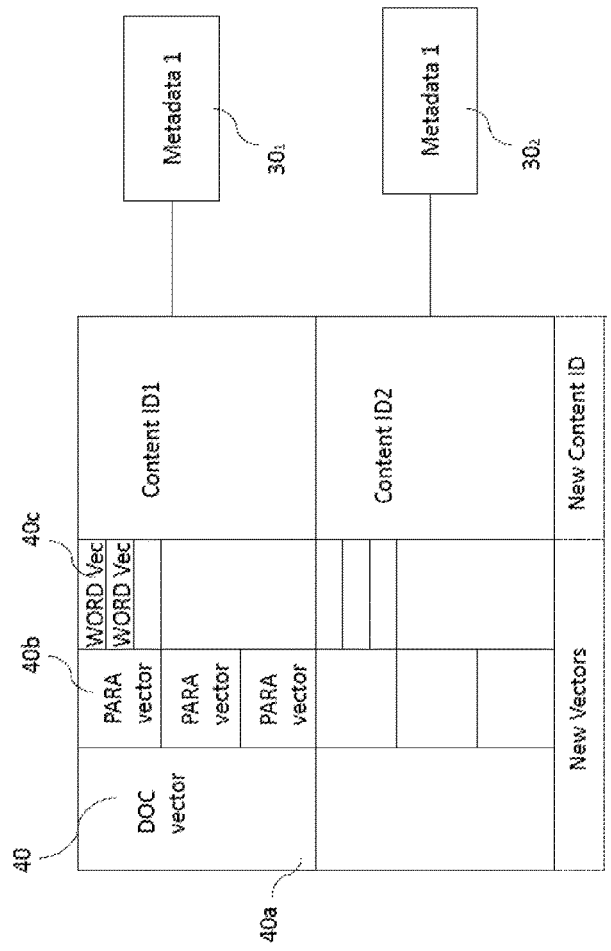

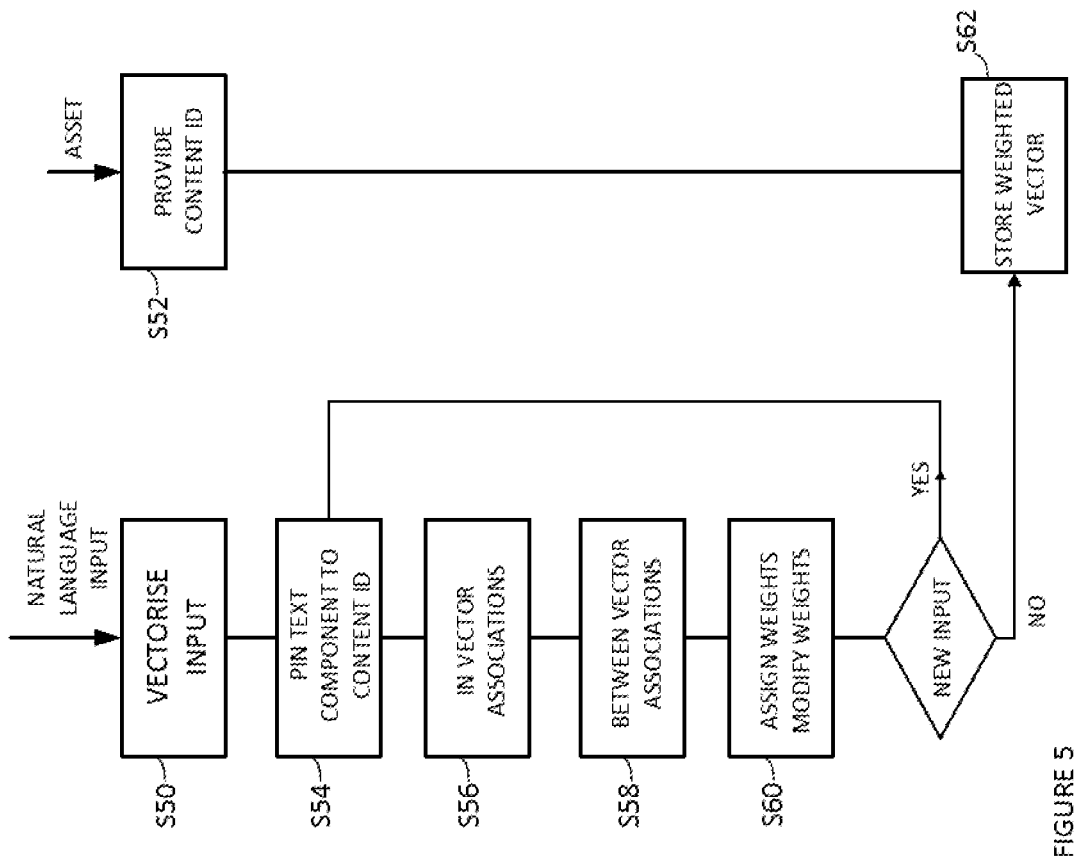

CONTENT ACCESS AND STORAGE

BACKGROUND OF THE INVENTION

Field of the Invention

The present disclosure relates to methods and systems for content access and storage.

Description of the Related Art

Content stores are facing ever-increasing challenges. Nowadays content, particularly media content, can take a wide variety of different forms and there is an ever-increasing wealth of content items which users or consumers might want to access.

Content items, or pieces of content, are stored in a content database accessible by content identifiers. The content identifier can be stored in association with its content item in the same database, or, more usually, can be in a separate content data store. When a user wishes to access a particular piece of content, they locate the content identifier (for example by entering a search query, or selecting a usual indicator of the piece of content) and this can then be used to access the content item from a remote content item database, for example through a network. Content items may be downloaded or streamed to use at a device at which a consumer is present, either from the content data store, or directly from the content database.

Content identifiers are stored with associated metadata, which represent a summary of the content item. One function of the metadata is to provide a brief description of the piece of content for a variety of different purposes, including understanding what is in the content store (reporting) and enabling access by a consumer of particular pieces of content. For example, content can be searched for by searching only through the metadata and not through the entire pieces of content. Pieces of content may be, for example, a single content item, or a selection of shows or parts of a series (e.g. a television or box set series).

One challenge which arises is in populating a content datastore. When a new piece of metadata defining a piece of content is supplied, it would be useful to understand that that piece of content was in fact already in the datastore. However, if the piece of content arrives with metadata which differs from the metadata which is already stored, it may be difficult for a storage process to autonomously understand that that data item is already in the content store. Therefore, human intervention is needed to assess whether or not the piece of content with its associated metadata is already in the store. Frequently, for this reason, content databases hold multiple copies of the same piece of content. It would be desirable to avoid this if possible.

Moreover, when searching for a piece of content consumers often wish to be provided with content matching a particular request that they make. The consumer request may be in natural language text, or in short form notes, and it would be desirable if such natural language queries or short form notes could nevertheless cause content items matching the consumers request to be identified. Consumer may also wish to make request by voice.

These and other problems and challenges are met by the present disclosure.

SUMMARY OF THE INVENTION

The techniques and systems disclosed in the following description use a machine learning approach to discover semantic rules and conceptual associations to access content rather than requiring these rules and associations to be articulated by the developer or administrator of the content system directly.

An aspect may provide a method of generating matching metadata vectors for identifying content items in a store searchable by input vectors, the method comprising: receiving multiple training inputs, each training input comprising a content identifier indicative of a content item, and at least one natural language description of the content item; for each training input: converting the natural language description into at least one text component; generating at least one vector, each vector corresponding to one text component; generating a set of component parts for each vector, each component part corresponding to an element; applying a random coordinate to each component part of each vector; adjusting each random coordinate based on the relationship of each component part to each element; determining a weighting for each component part; and defining a metadata vector for each item comprising the vectors for that item and based on the adjusted random coordinate and the weighting for each component part of each vector.

The step of adjusting each random coordinate based on the relationship of each component part to each element may comprise assigning an association strength to each component part of each vector, the association strength being indicative of the association of that component part of the vector with a respective element.

The step of determining a weighting for each component part may comprise determining if a vector provides a correct identification of content for a given set of weightings, and if note adjusting the weightings.

An aspect provides a method of generating matching metadata vectors for identifying content items in a store searchable by input vectors, the method comprising: receiving multiple training inputs, each training input comprising a content identifier indicative of a content item, and at least one natural language description of the content item; for each training input: converting the natural language description into at least one text component; generating at least one vector, each vector corresponding to one text component; generating a set of component parts for each vector, each component part corresponding to a coordinate initialized with a random value; adjusting each random coordinate based on the relationship of each component part to other vectors; determining a weighting for each vector with respect to the item; and defining a metadata vector for each item comprising the vectors containing the adjusted coordinates for that item and the weighting for each vector.

At least one training input may be associated with a plurality of descriptions.

Each component part may correspond to an element, and a random coordinate may be applied to each component part of each vector. Each element may comprise a category, with at least one text component corresponding to that category. Each element may correspond to one of: a setting a place; a name; a title; or a definer of at least one of a setting, a place, a name of a title.

Each component part may correspond to an element, and a random coordinate may be applied to each component part of each vector.

The step of adjusting each random coordinate based on the relationship of each component part to each element comprises assigning an association strength to each component part of each vector, the association strength being indicative of the association of that component part of the vector with a respective element.

The step of determining a weighting for each vector with respect to the item may comprise determining if a vector provides a correct identification of content for a given set of weightings, and if not adjusting the weightings.

The method may further comprise storing a graph structure comprising a plurality of nodes, some nodes representing content items and some nodes representing text components, wherein the nodes are connected by links according to the adjusted assigned weights.

The natural language description may be held in the store in association with the content identifier to which it relates.

The natural language description may be one of: a long synopsis of the content item; a short overview of the content item; an abbreviated summary of the content item.

Each training input may comprise multiple natural language descriptions of different semantic levels, the method comprising deriving one or more metadata vector for each semantic level.

The method may comprise storing a tabular structure comprising metadata vectors for multiple semantic levels associated with each content identifier.

The method may further comprise the steps of: receiving a search input comprising a natural language description of an unknown content item, which lacks a content identifier; vectorising the natural language description into a search vector comprising a set of text components and assigning a weight to each text component; comparing the search vector to each metadata vector derived from the training inputs to generate a list of possible matches; computing a score for each possible match based on vector similarities; and filtering the list of possible matches based on the similarity score to determine if the search input has a match within the training inputs.

The step of filtering may be defined by applying a threshold.

The step of vectoring the natural language description may be based on a frequency of occurrence of the text in the search input.

The assigned weights may be based on frequency of occurrence of the text component in the search input and/or wherein the assigned weights are indicative of the predictive power of a text component to associate with a search for content item.

The method may further comprise the steps of: presenting the match results to a user; receiving confirmation from the user that the match is a correct match, or that the match is an incorrect match; and where the user confirms that the match is a correct match, associating the content identifier with the search input to create a further training input.

If the user identifies that the match is an incorrect match, a correct content identifier may be received from the user and associating the correct content identifier with the search input to create a further training input.

There is a provided a content access and storage system comprising: a store holding a plurality of content identifiers, each content identifier indicative of a content item; and a computer configured to execute a computer program to carry out the method as defined The content access and storage system may hold a graph structure comprising a plurality of nodes, some nodes representing content items and some nodes representing text components, wherein the nodes are connected by links according to the adjusted weights.

A content access and storage system may comprise a user interface configured to receive a search input from a user and to receive feedback from the user identifying a content identifier to be associated with the search input.

There may also be provided a method of accessing a content store comprising a plurality of metadata vectors, each metadata vector corresponding to a content identifier, and each metadata vector having a plurality of vector components each corresponding to a plurality of elements, each component being associated with a value, the method comprising: receiving a search input comprising a natural language description of an unknown content item, which lacks a content identifier; vectorising the natural language description into a search vector comprising a set of text components and assigning a weight to each text component; comparing the search vector to each metadata vector to generate a list of possible matches; computing a score for each possible match based on vector similarities; and filtering the list of possible matches based on the similarity score to determine if the search input has a match within the training inputs.

An aspect provides a content access and storage system comprising a store of metadata vectors in accordance with the method as defined, and a computer program which when executed by a processor performs the method steps as defined.

There is provided a first method of generating matching metadata vectors for identifying content items in a store searchable by input vectors, the method comprising: receiving multiple training inputs, each training input comprising a content identifier indicative of a content item, with a natural language description of the content item; for each training input, vectorising the natural language description into a vector representing a set of classified text components and assigning a weight to each text component of the vector based on the frequency of occurrence of the text component of other vectors derived from training inputs having the same content identifier; determining associations within vectors by identifying common text components which are text components which are represented in the same vector, wherein an indicated association strength depends on the frequency with which the text components occur in the same natural language description; adjusting the assigned weight of each text component of a vector based on the indicated association strength with another text component represented by other vectors derived from training inputs having the same content identifier; and deriving a metadata vector for the content item from the set of text components, each with its adjusted assigned weight.

There is provided a second method of accessing a content store holding a plurality of content items each associated with a cohort of metadata vectors representing classified text objects each associated with an assigned weight representing the frequency of occurrence of the text component in the cohort of metadata vectors for the content item, and the frequency with which the text component occurred with at least one other text component in the same natural language description represented by a metadata vector in the cohort of metadata vectors, the method comprising: receiving as a search input a natural language description of a content item; vectorising the natural language description into a search vector comprising a set of classified text components, and assigning a weight to each text component of the search vector based on the frequency of occurrence of the text component in the natural language description of the search input; comparing the search vector to each metadata vector in the content store to generate a list of possible matches, each match having a probability that it is a valid match, when the probability is based on the weight assigned to text components matched between the search vector and each metadata vector.

There is particularly useful synergy between these two methods, whereby search inputs provided by consumers looking for content items can be used as training inputs to further enhance and enrich the text objects associated with content identifiers in the store.

For the first method, some preferable adaptations may apply.

In the first method, there may be included the step of storing a graph structure comprising a plurality of nodes, some nodes representing content items and some nodes representing text components, wherein the nodes are connected by links according to the adjusted assigned weights.

In the first method, the text component may comprise one of: a setting; a place; a name; a title; a definer of at least one of the above.

In the first method the natural language description may also held in the store in association with the content identifier to which it relates.

In the first method the natural language description may be one of: a long synopsis of the content item; a short overview of the content item; an abbreviated summary of the content item.

In the first method each training input may comprise multiple natural language descriptions of different semantic levels, the method comprising deriving one or more metadata vector for each semantic level. This may comprise storing a tabular structure comprising metadata vectors for multiple semantic levels associated with each content identifier.

In the first method here may be the step of receiving a search input comprising a natural language description of an unknown content item, which lacks a content identifier; vectorising the natural language description into a search vector comprising a set of classified text components and assigning a weight to each text component to the vector based on the frequency of occurrence of the text component in the search input; comparing the search vector to each metadata vector derived from the training inputs to generate a list of possible matches and identifying at least one match to be presented to a user; receiving confirmation from the user that the match is a correct match, or that the match is an incorrect match; and where the user confirms that the match is a correct match, associating the content identifier with the search input to create a further training input.

If the user identifies that the match is an incorrect match, then the first method may receive a correct content identifier from the user and associating the correct content identifier with the search input to create a further training input.

Corresponding to the first method, there may be provided a content access and storage system comprising: a store holding a plurality of content identifiers, each content identifier indicative of a content item; and a computer configured to execute a computer program to carry out the first method or any modifications thereto.

The store may hold a graph structure comprising a plurality of nodes, some nodes representing content items and some nodes representing text components, wherein the nodes are connected by links according to the adjusted weights.

In the second method, the assigned weights may be indicative of the predictive power of a text component to associate with a searched for content item.

The second method may further comprise the step of, where a match is indicated above a threshold probability, associating the search vector with a content identifier of the matched content item in the content store. In the second method, when no match is indicated, or a match below a threshold probability occurs, the search vector is added to the content store with a new content identifier of the content item described by the natural language description.

Corresponding to the second method there is provided a content access and storage system comprising a store of content identifiers each indicative of a content item, each content identifiers associated with a cohort of metadata vectors having a set of classified text objects, each associated with an assigned weight representing the frequency of occurrence of the tax objects component in the cohort of metadata vectors for the content item, and the frequency with which the text object component occurs with at least one other text object in the same metadata vector in the cohort of metadata vectors, and a computer program by computer program which when executed by a processor carries out the steps of the second method or any modifications thereto.

For a better understanding of the present invention and to show how the same may be carried into effect reference will now be made by way of example to the accompanying drawings.

DESCRIPTION OF THE DRAWINGS

FIG. 1 is a schematic block diagram of a content access and storage system:

FIG. 2 is a flowchart of matching an input to metadata vectors in a store;

FIG. 3 is a schematic diagram showing the mapping of metadata vectors to content items;

FIG. 4 is a schematic diagram of one example vector;

FIG. 5 is a schematic flowchart describing a training process;

DESCRIPTION OF PREFERRED EMBODIMENTS

Figure 6:
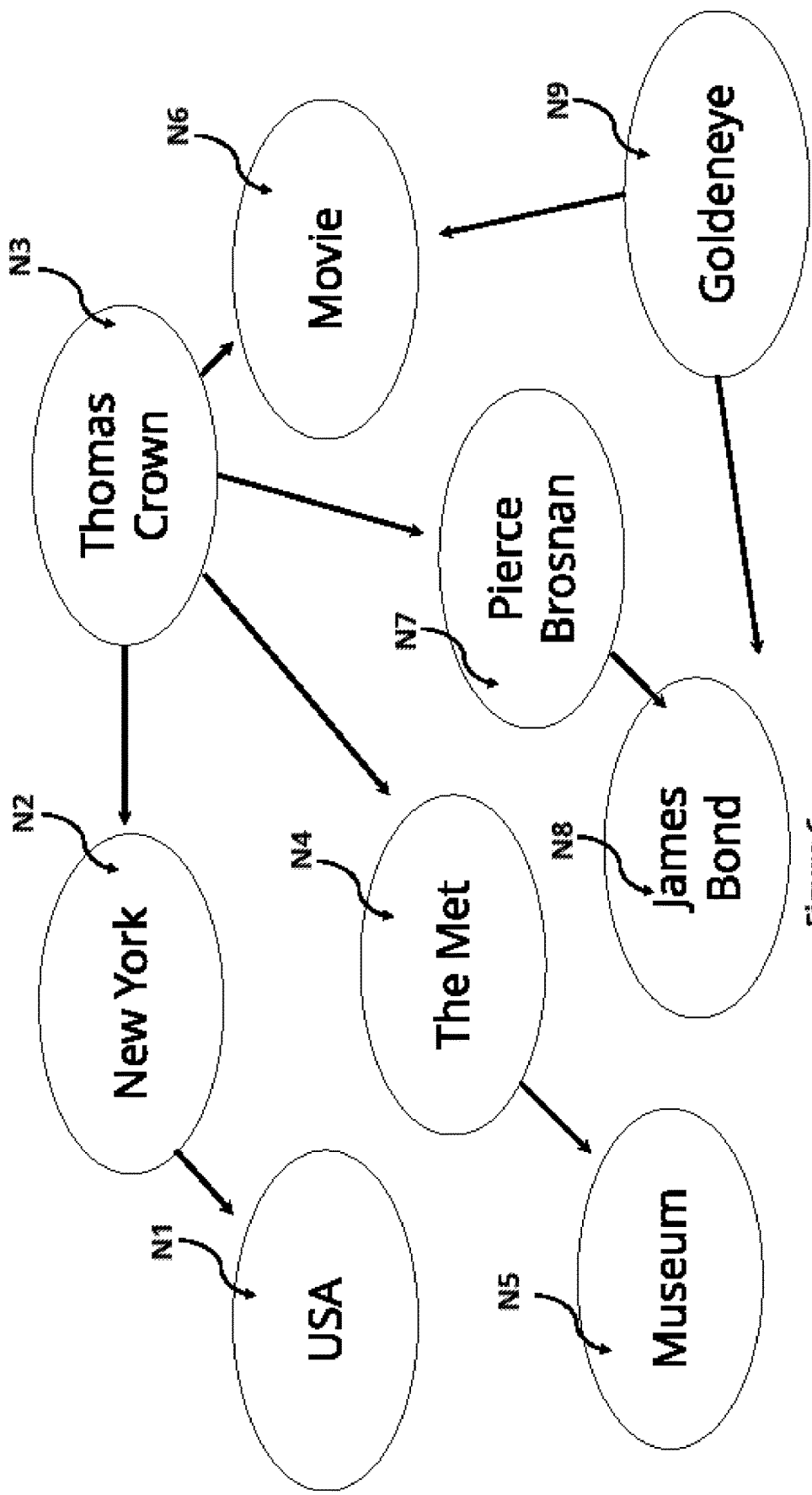
FIG. 6 shows an example of a graph structure for holding metadata in the content store.

FIG. 1 is a schematic block diagram of a content access and storage system. A content database 2 holds content items which can be accessed by users. The content database 2 is shown divided into two separate bits of architecture, a content metadata store 4 and a content store 6. The content metadata store 4 stores metadata for a collection of content. The metadata is stored in association with content identifiers, each content identifier uniquely identifying a piece of content in the content store 6. Different architectures are possible. For example, the content items could be held in the same store as the content metadata. Alternatively, the content store could be outside the content database 2 and accessible through a network or other remote means using the content identifiers.

In the content metadata store 4, each content identifier enables a particular piece of content or group of content items to be accessed from the content store 6. In itself, this is well known and is not discussed further herein. Any suitable mechanism could be utilised.

Note that in this description metadata in the content metadata store is in the form of individual 'features', each feature represents a node in a graph, as disclosed later. This is derived from, but is distinct from, textual input metadata in the form of description language. Such metadata may also be retained in a metadata store 13, for reason discussed later.

Two particular challenges exists for content stores.

A first challenge is referred to herein as "matching". In brief, this is the requirement when importing metadata into the content metadata store 4 that the system needs to be able to match each incoming piece or set of metadata with existing metadata already in the system to be able to identify whether the incoming metadata identifies an existing piece of content in the content store 6, or identifies previously unknown content.

A second challenge is referred to herein as "querying". When a user 8 wishes to interrogate the content database 2 for information, he may wish to identify content items which match certain criteria. The user may not know precisely by what metadata the content item is already identified, and may therefore wish to pose a query in a style that he finds most convenient, for example the spoken word or typed natural language text. Such a query is labelled 10, and is supplied via a human interface 12 into the system. The system should be capable of receiving such a query and to return matched content items which fit most closely the users' query. Such matches are referenced by reference numeral 16.

These challenges are set out in more detail in the following.

Matching

The database 2 of whatever format and using whatever technology, is used to store metadata for a collection of items, e.g., video content. This metadata comprises titles, descriptions, parental warnings, genre identifiers and other information about each content item.

It is accepted that any piece of content, whether a home movie, a radio show, a book, a season of TV shows, individual episodes, movies, adverts and all other types and groups of media, may have cause to be described in many different ways.

For example, a TV show's description may have several forms:
- a long synopsis suitable for showing on an IMDb page
- a short overview typical of those printed in listings magazines
- abbreviated summaries that are shown on TV screen EPGs (Electronic Program Guides)

Indeed, all content may be described, titled, rated or otherwise described somewhat differently in content metadata by every publisher of content. In this way, it is the sum total of all descriptors that comprises what might be called the definitive set of metadata for a particular content item or group of content items. A group of content items could be for example a show or episode within a series or a season. The metadata could define the whole series or season, from which an episode could be chosen.

While many of these variations arise because of a need to make the information suitable for different outlets where people consume the information, it is also entirely possible that metadata sources have been adapted for use by other computer systems.

It is, therefore, the case that data about content items may be encountered in a variety of forms, formats, and representations which are seemingly incompatible with each other and any particular database's representation but which it would be advantageous to use to describe content items.

When importing data from disparate sources, it is an objective that the system be able to match each incoming piece or set of metadata with each existing set, or to be able to identify certain incoming data as referring to previously unknown content.

As a simple example: suppose that a system database already contains a record for: "Star Trek: The Next Generation", "Episode 5", "Season 1". As part of the process of importing metadata from another source, the system encounters a record: "Star Trek TNG: The Last Output", "Episode S1E5". The imported metadata might include individual data, for example a cast list that was not already in the database.

It is an objective that the system be able to operate a process that successfully identifies this new metadata as belonging to the existing record. In so doing, any new information contained in this new metadata can be used to augment and improve the breadth of information held about the episode in this existing metadata. By successfully making the connection between the existing metadata and the new metadata this additional information can be added to the sum of that episode's metadata.

Such a process helps to expand upon what is known about each item of content but also provides other benefits. For example, successful matching of new metadata to an existing record ensures the database only ever holds one representation of a particular item of content. Without being able to match, it is entirely possible that the database would contain several records for the same item. This is both inefficient and problematic for reporting purposes.

Querying

A similar issue arises when a user 8 wishes to interrogate the database 2 for information. The user 8 may wish to identify items of content which match certain criteria. This query would most readily be posed in a style that the user finds most convenient—e.g., the spoken word, or free entry typed text.

To make the store 4 of content metadata as flexible as possible, being able to respond to a request 10 while being ambivalent about the form of query is immensely beneficial. For example, it renders possible having a single representation of each content item's metadata for all possible uses of it.

These objectives are addressed herein by providing a translation interface 14 onto a data store 2 that can accept spoken or free entry requests in natural language and/or with abbreviated information such as "what's the war movie with that guy from Friends in it?" and match that with an existing content item.

The process described herein transforms such inputs by a translation process without requiring item-by-item manual adaptation by a human operator acting to transform the data, so that it is useful within a computer domain—i.e., a machine can perform the matching.

Both of the example problems described above—matching and querying—can be seen as expressing a need to translate between the natural language used by people and a query language used by a computer system.

In the first example, a query resulting from this translation process allows the computer system to match new metadata with existing metadata; while in the second, the result allows this metadata to be retrieved for some other purpose, such as to offer a range of content to watch.

Existing systems that seek to provide solutions to the challenges rely heavily on translating by applying a set of predetermined semantic rules. These systems are made ever more sophisticated by adding additional rules to allow the system to interpret ever more complex grammar. However, this approach is inherently limited by the operator's ability both to anticipate all the relevant rules and to formulate these in ways a machine can understand.

The system described herein takes a different approach by using a machine learning approach to translate the input rather than relying on predetermined rules.

A broad overview of a matching process is described in FIG. 2. In Step S20 an input is first vectorised by for example: resolving it into natural language components; resolving it to an ordered list of likely separations and then into natural language components; or otherwise. For example, as speech-to-text conversion cannot "hear" a comma, the phrase "the car with the number on that's green" could mean the car is green or the number is green, so there are two likely separations. These two different ways of resolving the natural language components (the two likely separations) might both be outputs from the vectorisation process. Each may be given a score based on the probability that that was the intended interpretation or separation. An ordered list of vectors, based on probability, is provided as denoted by step S22. This is known practice, and is not described further herein. The natural language components are referred to herein as classified text components.

The classified text components may be individual words or groups of words. Words may be grouped according to the likely separation of a sequence of words.

A machine learning process (MLP) 18 within the translator 14 uses this vectorised version of the input to compare it to known content metadata vectors to identify a list of matches. This is denoted by step S24 in FIG. 2.

The matches are then output, as denoted by step S26, ordered by probability.

In order to achieve improved matching, a training process is utilised. In general this is a process for enhancing the metadata for a given content. After an initial training period this metadata may still be enhanced, for example when a new input is received purporting to provide content for addition to the system.

The MLP 18 is shown for diagrammatic purposes in the translation module 14, but it could be implemented anywhere that is appropriate. The MLP can be implemented by a computer program which is loaded into a memory and executed by one or more processor. The MLP could be implemented using one computer or many computers—parts of the MLP could be distributed across multiple servers for example. Machine learning is itself not new, and in fact there are many different implementations of machine learning processes. They have however some characteristics in common. Machine learning is used for example to extract meaning from text for such applications as speech-to-text conversion. In a machine learning process, information that the process has extracted from an input is referred to as a "feature". In the present application of a machine learning process for accessing and storing content in a content store, such a feature might be the kind of thing that defines a piece of content in some way, for example a descriptive phrase such as "set in London" or "kitchen sink melodrama". During a machine learning process, patterns of incoming text emerge. In known machine learning processes, these patterns pertain to the grammar of the text, and understanding grammatical structures of input text allow features to be derived.

When using the context of the present application, the machine learning process goes one step further. In the present context, patterns of the text input emerge which are not just grammatical, but which instead pertain to the way in which metadata generally defines content. As these patterns emerge, the machine learning process is more readily able to identify features, such as the descriptive phrases mentioned above, and to understand what implications these features might have for the kind of content being identified. This extra layer of learning infers patterns that then can give rise to features that may not have emerged from a straightforward grammatical analysis of the text. By inferring these patterns, it is possible to import some meaning to certain phrases which are frequently used to describe content.

One example is "set in" which the machine learning process will come to learn after several training inputs, generally is followed by geography or location for the content item. Phrases such as "pursued by" or "fearing another attack" are less commonly used phrases which would appear as features for the purpose of the analysis to be described therein.

During training, the machine learning process 18 determines which features (classified text components) derived from the inferred patterns of the vectorised input are relevant in assessing whether an input is associated with known content metadata. The process calculates relative weights to assign to each known content metadata vector component and calculates the relative weights to assign to each such feature. The weights are adjusted such that features with better predictive power carry the most weight, and weakly predictive ones carry less weight. An often used phrase like "pursued by cops" carries less predictive weight than a lesser used phrase such as "set in Jupiter", since the latter is more distinctive.

By letting a machine learning training process identify the features from the inferred patterns, any bias resulting from operator configuration is minimised. The training process is described in more detail later.

The translation module 14 works by using machine learning to unpack each query, and each incoming training input. So, as the translation module receives each new input (from the training interface, or from user), it can build up associations between words/phrases and learn semantic rules that improve its vectorisation.

To use the Star Trek example, mentioned earlier, MLP 18 translates "S1E5" into "Season 1, Episode 5" because this is a pattern it has learned through observation of lots of TV shows and which therefore allows it to vectorise both 'S1E5' and 'Season 1, Episode 5' into the same output. This output is represented by a vectorised matrix in a standard way.

As such, when it sees a new input for a new programme, e.g. 'Roseanne S4E15', the MLP 18 translates this into 'Roseanne, Season 4, Episode 15' even if this is the first episode it has even seen for this programme.

After the machine learning training phase, when the MLP 18 is presented with a fresh vectorised input, it can use the patterns, features and weightings that it has learned to determine which existing content item(s) may be similar to the one described by the input. If an input can be resolved into more than one vector, the outputs are further weighted (ordered) according to the weights given to each vectorisation.

When this process is used to query the database for content, the system may return a list of matches ordered by probability. When used to match or subsequently augment the stored metadata with new information, it may use only those matches that are found to have a probability above a certain threshold. If no qualifying matches are found by this method, or if there are no matches, or only matches below a certain threshold, the system may conclude that there is no match and that this new information refers to a new item of content. The system may create a record for this item or it may add it to a queue of potential new records for a human operator, or external system, to consider.

Likewise, when matching, the system may take only the most probable match or, if there are many high quality matches, add the details to a queue for a human operator/external system to make the final determination.

Decisions resulting from any of these enqueued items may be used to improve the machine learning process so that new patterns or features can be deduced or their weightings adjusted, by providing more training inputs.

The training phase will now be described in more detail. Before doing so, reference is made to FIG. 6 to describe how content items are represented in the content data store 4 in a graph structure. The content data store is much more than a store of content metadata. The store comprises a set of nodes N, which are all connected to each other. Nine nodes are shown in FIG. 6, but it will be evident that in practice there will be an extremely large number of nodes, each connected to each other. Some nodes will be connected only to one other node (for example N1-N2), whereas other nodes will be connected to multiple nodes (for example N3-N2, N4, N5, N6). Each node represents a concept (feature) equating to the text components derived from the vectors. Some nodes represent a classification concept (feature), for example node N6 represents the concept of 'movie'. Other nodes represent content titles (for example N3 and N9). Because these nodes represent movie titles, these nodes are connected to the node representing the concept 'movie' denoted by node N6. The nodes are connected to each other to indicate a relationship. One relationship is the example which has just been given that a movie title relates to the concept of movie. These relationships had been derived by vectorising the inputs. The system might have created links between 'Thomas Crown', 'New York' and 'the Met' because metadata has been received for the movie 'The Thomas Crown affair' that included the terms 'New York' and the Met'.

FIG. 3 shows a layered structure of vectors associated with content identifiers.

Each content identifier, ID1, ID2 is associated with a respective set of metadata $30_1$ $30_2$ which is a sum set of all metadata which has been provided for that particular piece of content. This metadata can be in natural language form, abbreviated form or any other form. However, each content identifier is also associated with text objects derived from at least one vector 40 [representing text objects shown in FIG. 4] which has been derived from input metadata. When an incoming natural language description is vectorised, it may be vectorised at different levels (layers). For example, it may be vectorised into a document vector 40, or broken down into paragraphs where each paragraph is converted into paragraph vectors 40b or split into words where each word is vectorised, 40c.

FIG. 3 illustrates a tabulated structure where these vectors are associated with identifiers. Note that similar information is provided by the graph structure of FIG. 6, but this graph structure additionally indicates the association strengths between the vectorised objects. Note that each vector could be associated with different tags, where each tag represents a text component or combination of text components, and certain tags could be indicated as more important than other tags, based on their predictive qualities (weights).

Each vector could further be associated with a level or a layer indicator which indicates whether it is a document vector, paragraph vector or word vector. In a tabulated structure these level indicators may not be necessary, because the tabulation would indicate where an expected vector would be stored. However, when stored in a graph structure such level indicators may be important.

The bottom row in FIG. 3 indicates the situation where new vectors are added for a new content identifier when it is being determined that an incoming vector does not already represent an existing piece of content.

The challenge for new metadata which has been converted into an incoming vector (using the machine learning process as described above) is for that vector and accompanying metadata to be stored in association with an existing content item if one exists already, or to be added as a new record in the content metadata store 4, a process described in more detail later on if one does not exist.

Note that it is not essential to retain the actual metadata separately (e.g., in store 13) from the vectors objects, but it can be useful to do so such that metadata can be recalled in an easy to understand format for a human user.

One reason for retaining the metadata is for future training. For example, when a user enters a query and feedback is received by the system, this query and feedback can be used to inform the machine learning. In such a case, existing metadata associated with the content item which was matched with the query can also be fed in to a new cycle of training, such that the old metadata can be used for retraining with the new information derived from the query and feedback.

Also, in some applications, online immediate training is possible. In other applications however, incoming metadata and training inputs are stored and the training is conducted as a batch process offline. In this situation, incoming metadata may be stored in the metadata store 13, ready for training in such an offline batch process.

Note that the content itself may also be held with a synopsis. This synopsis could be derived from metadata or separately written by a human. This synopsis can be stored with the content item or piece of content, in a record with that content item or piece of content. For example, when a content identifier is matched with a query, the synopsis may be presented to the user so that the user can see whether it is a content item he was searching for, before access to the full content item is carried out. Such a synopsis is different from the content metadata held in the content store in the graph structure, and different to the training metadata which is held in the metadata store 13.

The process for adding a new record will now be briefly described. Metadata is input into the system as a training input (or query input). If no match is found for the existing content item, a content identifier for the content item is inserted as a node into the graph of FIG. 6 of the content metadata store. This content identifier will point to a piece of content. In some cases, that piece of content might already exist in the content store 6, but in other cases it might be necessary to upload a new content item or piece of content to the content store 6 which is accessible by the new content identifier. In addition, when the content identifier is added as a node in the graph, its connections are also included, either to existing features at existing nodes, or to new features which are then added as new nodes in the graph.

The vectorisation process will now be described in more detail. The vectorisation process extends existing document vectorisation processes such as Word2Vec (a word to vector summarisation technique) or document to vector summarisation processes. According to such processes, common words within a language are collected from large training corpus and then converted into fixed size vectors via neural networks to capture their distributional similarities such that semantically similar words have more adjacent vectors, and semantically dissimilar words have distant vectors. These word vectors therefore capture how any given two words are related to each other semantically. Such a process is extended herein in a number of respects.

Vectorisation is carried out in 'layers'. According to the example described herein, these layers are documents/paragraphs/words. Other possibilities for layering also exist.

Moreover, a graph structure (FIG. 6) retains information about the associations and links between vectorised text objects as described more fully herein. Thus, according to the described embodiments of the present invention, additional information is associated with each vector that describes important aspects of the original metadata that led to the machine learning algorithm deriving that particular vector for this particular item of content. The present system first determines which items are similar, and also remembers what it was about them that led to this conclusion of similarity.

Each vector represents a set of classified text components which give the vector its particular characteristics (features/pattern). For example, a vector may represent a setting component, a place component, a name component, a title component etc. An example is shown in FIG. 4. In this context, some terminology is useful. The word association is used herein in two contexts. Associations are determined within vectors by identifying common text components which are text components which occur in the same vector. For example, a vector which has "west coast" in its setting component 40a might often have "Los Angeles" in its place component 40b. An indicated association strength depends on the frequency within which text components occur in the same vector. For example, if "Los Angeles" often occurs in vectors with "west coast", this would have a high indicated associated strength. In other vectors, "west coast" might occur with San Francisco only once or twice, and it would have an association, but a lower indicated association strength.

Another association is an association between linked concepts (a link association). In the above example, the place Los Angeles would have an association with the place "San Francisco" because they had both been in vectors for which the setting was west coast.

Note also that the vectors can be associated with content identifiers. Individual text component within vectors can be associated with content identifiers, and the association strength can depend on a number of times a particular text component is associated with a particular content identifier. For example, if "New York" is often to be found in a place component of a vector identifying the movie Die Hard, there would be a strong association indicated between New York and Die Hard.

By way of another example, the Thomas Crown node N3 for the movie ("The Thomas Crown Affair"), may very well have picked up an association with 'Claude Monet' (because he was the artist who painted one of the pieces used in the movie, and because it is referenced once by the movie's Wikipedia page); but 'The Thomas Crown Affair' movie would have a stronger association with 'Faye Dunaway' because she is in both versions of the movie and is mentioned often in reviews and commentary about the movie (i.e., the training data). So while Monet and Dunaway would both appear in the vectorised object a and vectorised object b list for the movie (FIG. 3), their respective weights Wa, Wb would be different.

By creating associations between vectors and content identifiers, between vectors themselves, and within vectors, weights can be assigned which reflect accurately the probability of text components being good or bad predictors of particular content items. This can be achieved in the training. Training data may be supplied from a training interface 17 in a form of a large number of pairs of inputs. Each pair is a piece of natural language and a piece of content (asset). The pieces of natural language might come from the description of the asset (for example a write up on IMDb, a weekly article, a magazine listing etc.) such that the training phase is provided with natural language and the asset to which it is mapped.

Returning to FIG. 6, based on lots of other metadata about lots of other movies and TV shows, the system has also created a link between New York and USA. This link may never have been present in any metadata about the Thomas Crown affair, but because it is linked to New York and that is linked to USA, the system knows that some link exists between the Thomas Crown Affair and USA. As such, if a user requests 'that movie set in the US where that guy who used to be James Bond steals from a museum', the system can identify the concepts (text objects) in the query (e.g. 'movie' US' 'male actor' 'James Bond' 'museum'), locate these nodes in the store and then look for another node that represents a movie that links them all. This is the mechanism by which intelligence gleaned from metadata about other pieces of content is used to improve the system's overall understanding of a query or a new piece of metadata. The strength of a relationship between two concepts increases through repetition. So if the system sees many instances of 'US' and 'New York', then it can be sure of that association. However, the system may also have seen a piece of metadata that said 'York, 'USA'—this was a typo, but because it occurs much less often that 'New York' and 'USA' in instances it sees, while a very weak association may have been created, it is far outweighed by the correct association.

FIG. 5 shows the training process. For each input, the natural language part is vectorised at step S50 in the same manner as step S20 in FIG. 2. The asset part is associated with a content identifier at step S52. Note that for the purposes of training, the content identifier is provided, so that all sets of metadata associated with that content identifier are known to be mapped to it. At step S54, the text components which have been derived by vectorising the natural language input are pinned to the provided content ID. As more training inputs are provided, more text components which appear in common are therefore pinned to the same content ID and the frequency of that association rises, such that the association weight rises. At step S56, association within vectors are determined. E.g. the frequency with which a particular setting occurs with a particular place. Vectors which have the same item in a particular text component are pinned to each other (for example a common setting), and this allows other text component in those vectors to become linked with an association strength or weight which depends on the frequency with which the association occurs. At step S58 this is referred to as between vector association. As more and more training inputs are provided, weights are assigned and modified based on the associations. When no more training inputs are to be read, the finally weighted vectorised objects are stored in association with the content ID, step S62.

The following example relates to the film Die Hard.

Assume that, prior to receiving further descriptions as set out below, the following associations have been derived from previously input metadata which has been vectorised.

"Skyscraper"
Set 1
NY
LA
Philadelphia
Tokyo
Washington
Babylon
(Note here that Set 1 is a group of terms "pinned to" (associated with) "skyscraper" that fall within a concept of "LOCATION")
Set 2
Building
Monument
Tower
Skyline
(Set 2 is a group of terms that fall within a concept of "PLACE"; also Set 1 of the associations to "Set in" below)
Set in
Set 1
City
Desert
Beach
Airport
Building
Set 2
Cities in general [Named cities, which would encompass Set 1 "LOCATION" item?]
Set 3
Combination of Set 1 and Set 2

The training phase is given the following pairs of inputs "natural language text"==> "content ID"

D1: "Tough New York cop John McClane finds himself in a tight situation when an office building in Los Angeles is taken over by terrorist. Apart from himself, everyone else in the building—including his wife—is held at gunpoint while their captors spell out their demands. The F.B.I. are called in to survey the situation, but John McClane has other plans for the terrorist"==>"Die Hard"

D2: "New York Cop John McClane flies to Los Angeles on Christmas eve to spend the holidays with his family. He arrives at the Nakatomi corp. building for his wife's office party. International terrorists take over the building and hold every one as hostage==>Die Hard"

D3: "John McClane is again trapped in a difficult situation. With his wife on an airplane circling Dulles Airport in Washington, terrorists take over the landing system and black out the airport. Ask the planes to land before they run out of fuel". ==> "Die Hard: Die Harder"

D4: "John McClane attempts to avert disaster as rogue military operatives seize control of Dulles International Airport in Washing, D.C."==> "Die Hard: Die Harder"

Now, having been trained, the system receives a query from a real user as, e.g., "What's the Die Hard movie set in the skyscraper?"

The system, which has already learned an association between "skyscraper" and descriptions that contain "building" and "New York", "Los Angeles" or "Chicago"; that the phrase "set in" indicates a locale where the movie takes place; and, that "flies to Los Angeles" is more indicative of setting that "New York cop" or "American tourist". It therefore matches "Die Hard", based in the following process.

Assume that an input query Q can be vectorised to contain text components $Q_1$="skyscraper" and $Q_2$="set in".

Q: $Q_1$ "skyscraper"
$Q_2$ "set in"

The text component $Q_2$ causes the MLP to look for an indication where a movie takes place and locations in general.

The system has learned already some associations to these two text components which appear in the four above description D1, D2, D3 and D4.

For the description D1 (Die Hard) the following text component can be extracted "NY" and "building". These are shown below with respective association weight to the text component $Q_1$ and $Q_2$.

$Q_1$: +NY 1+building (2×) 2 LA 1
$Q_2$: "NY cop": less indicative 0.5+building in LA: indicative 2+everyone in the building: indicative 1 [note here that NY cop has a lower weight than NY, because in the phrase 'NY cop' NY is used as an adjective for cop and not as a geographical location: the MLP 18 has discovered that NY or a geographical location is a stronger indicator of Die Hard].

A combined score is determined as follows:
everyone in the building=1×2=2+building in LA 2×2=4+ NY cop (less indicative)=0.5×1=0.5

Giving a total of 6.5. Similarly scores can be computed for the further descriptions as follows:

D2 (Die Hard)
$Q_1$: +NY 1+LA 2+building (2×) 2
$Q_2$: +NY cop: less indicative 0.5+flies to LA: indicative 1+at the building: indicative 1
$Q_1 \times Q_2$+flies to LA: indicative 1×1+at the building: indicative 1×1+NY cop: less indicative 0.5
Combined score=2.5

D3 (Die Harder)
$Q_1$+Washington 1
$Q_2$: +Airport in Washington: Indicative 1+airport: Indicative 1
$Q_1 \times Q_2$+airport in Washington 1×1: Combined score=1

D4 (Die Harder)
$Q_1$: +Washington 1
$Q_2$+airport in Washington: Indicative 1+airport: Indicative 1
$Q_1 \times Q_2$+airport in Washington 1×1: Combined score=1

Adding the results for each set of vectors associated with each of the movies give a result
Die Hard: D1=4+2.5+6.5=14
D2=4+2.5+2.5=9/23
Die Harder: D3=1+2+1=4
D4+1+2+1=4/8

So the system returns "Die Hard".

An exemplary process relating to matching is now described.

In a first step a plurality of training inputs are received. Each training input has a content identifier and one or natural language descriptions.

As an example:
Item1: "Die Hard"
D1: "Tough New York cop John McClane finds himself in a tight situation when an office building in Los Angeles is taken over by terrorist."
D2: "New York Cop John McClane flies to Los Angeles on Christmas eve to spend the holidays with his family"
Item 2: "Die Harder"
D3: "John McClane is again trapped in a difficult situation."

In this illustrated example there is shown two items, 'Item1' and 'Item2'. Each item has a unique content identifier, which is represented by the titles 'Die Hard' and Die Harder'. Item1 has two natural language descriptions, D1 and D2, associated with it. Item2 has one natural language description, D3, associated with it. Each description comprises natural language text.

example, "New York cop"→vec1; "John McClane"→vec2; "Los Angeles"→vec3.

At this point, in a fourth step a table can be constructed which will, in accordance with the remainder of the described process, determine values for the relationship between each vector of an item, and a plurality of elements. This is illustrated in Table I.

TABLE I

|  | Element 1 (e.g. category type: setting) | Element 2 (e.g. category type: place) | Element 3 (e.g. category type: name) | Element 4 (e.g. category type: title) |
| --- | --- | --- | --- | --- |
| Vec1 (John McClane") of item1 | -> | | | |
| Vec2 (Los Angeles" of item1 | -> | | | |
| Vec3 ("New York cop") of item1 | -> | | | |
| ... | | | | |

Different items will not have the same content identifier. However, if a content item is received after an initial training period, it may correspond to a content item already in the database, and therefore have a content identifier corresponding to the content identifier of existing content.

In general there is received a plurality of items each of which is associated with at least one natural language description. Each item has a content identifier, uniquely identifying the content with which it is associated.

Whilst inputs are received from multiple items, in the following description the process will be described for the processing of one specific item. Each item is processed separately (although this separate processing will likely be occurring in parallel).

In a second step, each natural language description for each item is converted into classified text components. Thus the natural language textual descriptions in the training inputs, for all inputs, are converted into classified text components. Examples of classified text components for the example given are "New York" the location and "John McClane" the person.

As an example, in the second step the descriptions from the first step for the first item, e.g., D1, D2, etc., are used to generate classified text components. Classified text components, in this example, are: "New York cop", "John McClane", "finds himself", "tight situation", "Los Angeles", "Christmas eve", etc.

A set of classified text descriptions for all items is thus generated. Where multiple natural language descriptions are provided for any item, such as the two descriptions for 'Item1' above, then the set of classified text components for that item includes the classified text components from all descriptions for that item.

The principle of likely separations may come into play here. The same word or expression may be included in different classified text components, based on different possible separations of a sentence.

In a third step, vectors comprising the classified text components are created. There is a one-to-one mapping between classified text components and vectors.

One vector is created for each classified text component. Thus, in an example, in the third step, the text components from the second step are utilised to initialise vectors. So, for It can be seen from Table I that for each vector of an item, there is a relationship with elements which each may represent a category, with the examples of categories being shown as: setting, place, name or title. Thus a relationship table can be constructed which has the same rows and columns.

In practice it will be understood that this is illustrative. There may be many more elements than shown, and the elements may not be the example categories shown. This is purely for ease of understanding.

In this way, each vector corresponding to an individual classified text component can be considered as a vector comprising a number of component parts, each component part of the vector identifying a characteristic of its relationship with an element. Thus each vector has a plurality of components.

In a fifth step, a random coordinate is assigned to each vector. The same random coordinate may be assigned to all the components of that vector. These coordinates may also be described as weights, and they may be described as training weights.

In this fifth step, preparation is being made for a subsequent step of combining the vectors. There can be hundreds (or more) vectors, for the same content identifier.

These vectors will be combined into a single "metadata vector" at the end of this process. This is done by weighed averaging of all the vectors as further described below, e.g. for a given item, the metadata_vector=w1*vec1+w2*vec2+w3*vec3 etc. These weights need not be frequency based, since they will be adjusted via training. Therefore in this fourth step random weights can be used, or simply a uniform value applied to all classified text components in the vector.

As an example initialize coordinates (or weights) are just numbers from 0 . . . 100. W1 is allocated for a first vector vec1; W2 is allocated for a second vector vec2; W3 is allocated for a third vector vec3 etc.

This can be further illustrated with reference to the following table, Table II. This table shows, for a given item such as Item1, a random initial coordinate (or weighting) of 0.3 applied to each of three vectors for that item for each element. For each vector (text component) there is applied a random coordinate for its relationship to the respective elements.

TABLE II

|  |  | Element 1 (e.g. category type: setting) | Element 2 (e.g. category type: place) | Element 3 (e.g. category type: name) | Element 4 (e.g. category type: title) |
| --- | --- | --- | --- | --- | --- |
| Vec1 (John McClane") of item1 | -> | W1vec1 (e.g. 0.3) | W2vec1 (e.g. 0.3) | W3vec1 (e.g. 0.3) | W4vec1 (e.g. 0.3) |
| Vec2 (Los Angeles") of item1 | -> | W1vec2 (e.g. 0.3) | W2vec2 (e.g. 0.3) | W3vec2 (e.g. 0.3) | W4vec2 (e.g. 0.3) |
| Vec3 ("New York cop") of item1 | -> | W1vec3 (e.g. 0.3) | W2vec3 (e.g. 0.3) | W3vec3 (e.g. 0.3) | W4vec3 (e.g. 0.3) |
| ... |  |  |  |  |  |

The number of columns (i.e. the number of elements) is determined by the implementers, and may typically be in the range of range of 50 to 300. The number of rows will correspond to the number of text components identified for the item.

After this fifth step, there is thus provided a plurality of vectors each having a set of component parts with coordinates (or weights), with the initially allocated coordinate being the same for each component part of the vector.

In a sixth step, the randomly allocated coordinates are adjusted.

The randomly allocated coordinates are adjusted based on the relationship of each component to each element. Based on this, the randomly allocated weighting for each component is adjusted.

In general terms, it can be understood that an association between a vector and an element is determined, and based on this association the corresponding coordinate for the respective coordinate is increased or reduced in value—in other words the weighting of that coordinate is increased or reduced.

The specific implementation of this, and the association used, may vary. In general, it can be considered that the coordinate is adjusted in accordance with an association strength.

Associations may be determined within each vector, to determine an association strength for each classified text component of a vector.

An example association process to determine association strength is as follows.

An association may be between text component vectors. This is what, in exemplary arrangements, word2vec does, by looking for patterns in the training data such that similar text component like "Los Angeles" and "New York" have vectors with small distances, i.e., they are determined to be similar. This is not using frequency per-se, but a more complex process of predicting what text component would fit a word pattern, like "I just flew into <fill in blank> this morning," whereby certain words fit much better than the rest.

These words would then have more similar vectors. This may be the case, for example, where the element is associated with the category if location.

This association is not derived from direct matching (e.g., does the vector contain "York" or not?), but for capturing similarity between inputs.

In general, some or all associations may be used to determine the association strength of each text component. Additional associations may also be used, with or without the described associations, to determine the association strength of each classified text component of each vector.

This may be done by identifying common text components within vectors for the same item, and assigning an association strength to each classified text component based on this determination.

This sixth step loosely describes what the Word2Vec (which is preferably implemented) may be doing. This can be separated out, however, from the first step. However it may also be considered to be part of the first step, and may occur before, after or in parallel with any of first to fifth steps.

This sixth step adjusts the vectors themselves to capture their association strengths with others, e.g., "New York" and "Manhattan" have strong associations, whereas "John McClane" and "Walter White" would be weak. This process is a preferable step.

In this sixth step, the association is used in order to compute a value for each vector based on its 'closeness' to other vectors for that item, to thereby adjust the coordinates.

The vectors generated in the second step may be adjusted, via word2vec capturing usage frequencies of each text component.

Text component vectors at step 4: Vec1' & Vec3' are closer (NY::LA) and Vec1' & Vec2' are further (NY::John McClane).

Table III illustrates this sixth step further.

TABLE III

|  |  | Element 1 (e.g. category type: setting) | Element 2 (e.g. category type: place) | Element 3 (e.g. category type: name) | Element 4 (e.g. category type: title) |
| --- | --- | --- | --- | --- | --- |
| Vec1' (John McClane") of item1 | -> | 0.2 | −0.5 | 0.8 | ... |
| Vec2' (Los Angeles") of item1 | -> | −0.7 | 0.1 | 0.4 | ... |

TABLE III-continued

|  | | Element 1 (e.g. category type: setting) | Element 2 (e.g. category type: place) | Element 3 (e.g. category type: name) | Element 4 (e.g. category type: title) |
|---|---|---|---|---|---|
| Vec3' ("New York cop") of item1 | -> | 0.3 | −0.2 | 0.7 | . . . |

Vec1, Vec2, Vec3 to denote that values for each vector are now changed. However Vec1' correspond to Vec1, Vec2' correspond to Vec2, and Vec3' corresponds to Vec3.

It can be understood that one example implementation is to compare each vector (e.g. Vec1) to each element, and then adjust the coordinate for that vector/element combination either to increase it or decrease it based on how closely they appear to be. In this way a plurality of revised vectors, Vec1', Vec2', Vec3' etc. are created, as the coordinates are adjusted.

The values within each column have no interpretable individual meaning. The value meaning is in their comparison with other values. The values have similar values to other similar vectors, and opposite (or dissimilar values) for dissimilar vectors. The formula for calculating the similarity between vectors can simply be (there are various formulas):

Vector Distance=(absolute_diff(component1)+absolute_diff(component2)+absolute_diff(component3))/3

In a seventh step, a weight is selected for each text component of each vector.

This can be considered as an association between text component vectors and an item via weights. This can also be considered as determining a "discriminate power" relationship. For example, "John McClane" is very strong for the "Die Hard" series, whereas "Walter White" is very strong for "Breaking Bad." However, to distinguish between the Die Hard movies, "John McClane" would be meaningless, since it occurs within all of them, whereas the names of the protagonist or locations such as skyscraper vs airport would be important distinguishing information. For this training, the vectors are not being changed, but the weights per item within the vector are being changed. These weights are changed to produce the most accurate mapping from text component vectors to the item identifier, e.g., vector of "John McClane"*weight+vector of "skyscraper"*weight=>Die Hard 1. The benefit for vectors here is if the input is "office building" instead of "skyscraper", the system can still infer it is "Die Hard" because of "generalization" via the vectorization step. This process is a typical machine learning process to minimize these mapping errors by adjusting the weights, regression or neural networks being examples.

This seventh step represents a distinct 'training' step. For example, the weights of the vectors that have strong discriminate power for "Die Hard" would be increased, such as "John McClane" and "international terrorists," whereas generic ones would be decreased, such as "family" or "plans." This is done via machine learning techniques, with the objective of adjusting the weights to minimize the error of predicting the content identifier ("Die Hard") from the set of input vectors describing an item.

More particularly, the adjustment comprises adjusting the assigned weight of each classified text component based on the discriminate power of that classified text component, so each vector of a classified text component has an adjusted weight representative of its discriminate power.

The weights are preferably adjusted by a machine learning process. This process is not concerned with purely with the distance between vectors, but is concerned with identifying vectors which have a relevant association for the item. It is concerned with how important each vector is for the item.

For example the weights generated in step 3 are adjusted. The weights are preferably adjusted to train for discriminate power. For example, W1 is important for Item1, W2 is important for Item 4, etc. Thus: W1' for Item1; W2' for Item1; W3' for Item1; W1' for Item2; W2' for Item2; W3' for Item3 etc. This is illustrated in Table IV.

TABLE IV

|  | | Element 1 (e.g. category type: setting) | Element 2 (e.g. category type: place) | Element 3 (e.g. category type: name) | Element 4 (e.g. category type: title) |
|---|---|---|---|---|---|
| Vec1 (John McClane") | -> | W1'vec1 (e.g. 0.3) | W2'vec1 (e.g. 0.3) | W3'vec1 (e.g. 0.3) | W4'vec1 (e.g. 0.3) |
| Vec2 (Los Angeles") | -> | W1'vec2 (e.g. 0.3) | W2'vec2 (e.g. 0.3) | W3'vec2 (e.g. 0.3) | W4'vec2 (e.g. 0.3) |
| Vec3 ("New York cop") | -> | W1'vec3 (e.g. 0.3) | W2'vec3 (e.g. 0.3) | W3'vec3 (e.g. 0.3) | W4'vec3 (e.g. 0.3) |
| . . . | | | | | |

One implementation for the seventh step is to allocate weights to each component part of the vector, and then determine whether the vector then points to the correct content identifier. If it does not, the weights can be adjusted. The weights can be adjusted until the system is trained to provide the correct result, the content identifiers being known.

Thus the weights may be determined by being selected and then adjusted. The selection may or may not be random. The selection and adjustment preferably utilised machine learning.

In an eighth step, a metadata vector for each content item (i.e. content identifier) is defined, including all the text components for that content item, with their associated adjusted coordinates and weights.

This eighth step is the final step to generate one single metadata vector per unique content item in the database, via the weighted averages. This final vector is used for faster similarity comparisons for subsequent querying to determine whether there is a match or not.

An association is made between metadata vectors. This association is to aid the matching phase, since the database can be millions of records. The metadata vectors are generated per item in the database, which are then compared to an input query vector (in a subsequent querying phase) to calculate the similarity based on vector distances to decide if there is a match. This is needed to make the system usable, by only comparing 1 vector to n vectors, n being #of records in the database. If we don't do this step, it would be q vectors by n*x vectors, q being the number of words in the input query, in the range of 5 to 200, and x being average number of words of all versions of synopsis for each item, in the range of hundred or even thousands. Obviously with n being in the millions, the number comparisons would be in the billions or trillions, thus would not be feasible.

The adjusted coordinates and the weights are utilised to derive this metadata.

For example: Item1→md_vec item1; Item2→md_vec item2; Item3→md_vec item3 etc.

Final metadata vector: This is generated simply as the weighted averages between the text component vectors times the weight for that vector, e.g., Md_vec item1=(Vec1'*W1' for item1+Vec2'*W2' for item1+ . . . )/number of text components for item1

This is illustrated in Table V.

TABLE V

|  | | Element 1 (e.g. category type: setting) | Element 2 (e.g. category type: place) | Element 3 (e.g. category type: name) | Element 4 (e.g. category type: title) |
| --- | --- | --- | --- | --- | --- |
| Md_vec_item1 (metadata for item1) | -> | 0.25 | −0.3 | 0.6 | . . . |
| Md_vec_item2 (metadata for item2) . . . | -> | −0.2 | −0.8 | −0.7 | . . . |

The similarity between any two items would then simply be (instead of hundreds of text component vectors due to long synopses):

Vector Distance(MD_vec1, Md_vec2)

The process reaches an objective of establishing a single metadata for a piece of content. The process automatically constructs a single metadata vector for every unique content in the database.

If a new description is to be added to this database, the same process can be undertaken to decide whether it should be merged with an existing metadata vector if it is an existing item, or create a new record if it is not an existing item.

Preferably, when a new content item is received, it is added to the system to provide an update metadata vector if the content is already in the system. If the content is new to the system, a new metadata vector is created.

Even when a new piece of content is provided after an initial training, adding the new piece of content to the database can be considered to be a further extension of this training. Each time a new piece of content is added, further training takes place. In the alternative, the process as described as a training process could be considered a 'maintaining' or 'updating' process when new content items are received.

Once the above described exemplary matching process has been used to 'train' the system, the system can be used to handle queries.

With the querying technique, the core idea is to convert the textual descriptions of the input query into a single metadata vector using a similar process as described above for matching, so it can be efficiently compared to the records within the database, which can have a very large number (e.g. millions) of records. By using the same (text) to (vector+weights) to (metadata vector) conversion process as described with the matching process, the comparison is a very fast similarity process–(metadata vector of query) compared to (metadata vectors of database) to give a score. The resulting score can be filtered and sorted for user queries, or automatically filtered via thresholding to determine whether there is a match or not.

A special case is where the user does have the content identifier, such as the user being an editor tasked with adding new items into the database. Even in this case, it is desirable to verify that this new item does not in fact already exist in the database since there may be others that may have already added this item.

In the case where the content item is absent, it should be added to the database and should be "learned" by the database.

An exemplary process relating to querying is now described.

The querying process is based upon the database having been created in accordance with the training process as set out hereinabove. The exact training process as set out hereinabove does not have to have been applied, but the database must hold the metadata structure which is the outcome of that training process as described. Of course, that metadata structure could be achieved by other technique than the exact training process as described.

Thus there is provided in the database an established set of metadata vectors each associated with one piece of content, these metadata vectors having a plurality of classified text objects, each classified text object having a respective assigned weighting.

As described in the matching process above, these assigned weighting may be determined by applying a common random weighting to each classified text object in a vector associated with a received input for a content identifier, then determining an association strength for each classified text object within a vector, and then adjusting each random weighting to give the assigned weighting.

The querying process thus commences with a trained database.

After establishment of the trained database, in a first step of the querying process an input is received, being a query to attempt to access content. For each such input, one or more vectors are generated, each vector comprising a set of classified text components. No content identifier is present.

This first step is similar to the first step of the matching process, but without the content identifier.

In a second step, a weight is assigned to each classified text component within each vector. This may be referred to a as a searching weight. This weight is based on the frequency of occurrence of that classified text component in the natural language of the input (so this is an association strength?).

This second step for calculating the weights is using frequency as a proxy for the discriminate power of the text components, since it is not known which content identifier the input query is associated with. So it is not an association strength, but measurement of how generic the input text component is.

The purpose of these 'searching' weights is the same as the 'training' weights—so the vectors comprising the text components of the query can be combined into one single input metadata vector.

In a third step, a metadata vector for the input query is defined by including all the text components with their associated weights. This third step is similar to the step in the matching process (the training phase) to generate one vector. The one vector is generated out of an arbitrary length of the input query.

In a fourth step, the metadata vector for the input query is compared to the metadata vectors stored in the database. Each input classified text component of the metadata vector for the input query is compared to each metadata classified text component in the metadata vectors stored in the database.

In a fifth step, any matched are scored. Specifically, the metadata vector for the input query is compared to each metadata vector within the database (the established set) to generate matching scores based on their similarity.

The machine learning process which is described herein addresses the challenges of storing content in a content store, and accessing that content using metadata which could be in the form of natural or abbreviated language. In an embodiment described herein, natural language is processed to understand the text components within them, and to provide weightings indicating what is the likely connection between different kinds of concept represented by the text components. Taking one simple example drawn from the above, if skyscraper and New York often appear in the same vector, or in vectors linked by a common concept, there would a higher weighting between this pair of text components than between the text components skyscraper and "York". The machine learning programme operates on a large number of training inputs in the first instance. Weights are adjusted as the training goes through. In the first vectorising step, S50 a vector is provided in which all the association weights within the vector and between the vector and the content identifier are equal. For the next vector, weights can start to be adjusted based on terms which occur in common with the first vector. For example, if 'west coast' is used in association with 'Los Angeles', a relation can be established between these two terms, and then weightings associated with 'west coast' can be brought into line with weighting associated with 'Los Angeles'. Each weighted vector is associated with the content identifier of the content item that it is associated with. Associations and their weightings can be adjusted based on repetition and frequency of use. Useful patterns can emerge from the analysis of vectors. For example, although 'Los Angeles' and the 'USA' may frequently be used together, it can be determined by training on many inputs that 'Los Angeles' might be a more important indicator than 'USA.'

The system used to generate matches for users that are providing queries can also be used to enhance training. The underlying process is the same. In the sense of training, metadata is provided with the asset with which it is associated. When a query is made, metadata is provided and a number of matches are returned. If a user then provides confirmation of a particular correct match, then this feedback can be used to associate the input metadata with the matched content item and this can be incorporated in further training to enhance the weights and associations. Thus, the system may be constantly learning either through updating of the content database with metadata and known assets, or by queries and feedback from those queries confirming a particular asset associated with the metadata.

The ability to associate concepts within vectors, between vectors and between vectors and content items allows metadata to be enriched with more tags, more weights and more patterns as the content database is augmented and/or queried.

The invention claimed is:

1. A method of generating matching metadata vectors for identifying content items in a store searchable by input vectors, the method comprising:
   receiving multiple training inputs, each training input comprising a content identifier indicative of a content item, and at least one natural language description of the content item;
   for each training input:
      converting the natural language description into at least one text component;
      generating at least one vector, each vector corresponding to one text component;
      generating a set of component parts for each vector, each component part corresponding to a coordinate initialized with a random value;
      adjusting each random coordinate based on the relationship of each component part to other vectors by assigning an association strength to each component part of each vector, the association strength being indicative of the association of that component part of the vector with the same component part of other vectors;
      determining a weighting for each vector with respect to the item; and
      defining a metadata vector for each item comprising the vectors containing the adjusted coordinates for that item and the weighting for each vector.

2. The method according to claim 1 wherein at least one training input is associated with a plurality of descriptions.

3. The method of claim 1 wherein each content item comprises a category, with at least one text component corresponding to that category.

4. The method of claim 3 wherein each content item corresponds to one of: a setting; a place; a name; a title; or a definer of at least one of a setting, a place, a name or a title.

5. The method according to claim 1 wherein each training input comprises multiple natural language descriptions of different semantic levels, the method further comprising:
   deriving one or more metadata vectors for each semantic level.

6. The method according to claim 5 further comprising:
   storing a tabular structure comprising the metadata vectors for multiple semantic levels associated with each content identifier.

7. The method according to claim 1 further comprising the steps of:
   receiving a search input comprising a natural language description of an unknown content item, which lacks a content identifier;

vectorising the natural language description into a search vector comprising a set of text components and assigning a weight to each text component;

comparing the search vector to each metadata vector derived from the training inputs to generate a list of possible matches;

computing a score for each possible match based on vector similarities; and filtering the list of possible matches based on the similarity score to determine that the search input has a match within the training inputs.

8. The method of claim 7 wherein the step of vectoring the natural language description is based on a frequency of occurrence of the text component in the search input.

9. The method of claim 7 wherein the determined weightings are based on a frequency of occurrence of the text component in the search input and wherein the determined weightings are indicative of predictive power of a text component to associate with a search for a content item.

10. The method according to claim 7 further comprising the steps of:
presenting match results to a user;
receiving confirmation from the user that a match is correct; and
associating the content identifier with the search input to create a further training input.

11. The method according to claim 10 further comprising the steps of:
receiving confirmation from the user that the match is incorrect;
receiving a correct content identifier from the user; and
associating the correct content identifier with the search input to create a further training input.

12. A content access and storage system comprising:
a store holding a plurality of content identifiers, each content identifier indicative of a content item; and
a computer configured to execute a computer program to carry out the method of claim 1.

13. A content access and storage system according to claim 12, wherein the store holds a graph structure comprising a plurality of nodes, some nodes representing content items and some nodes representing text components, wherein the nodes are connected by links according to adjusted weightings.

14. A content access storage system according to claim 12 further comprising:
a user interface configured to receive a search input from a user and to receive feedback from the user identifying a content identifier to be associated with the search input.

15. A method of accessing a content store comprising a plurality of metadata vectors generated according to the method of claim 1, the method comprising:
receiving a search input comprising a natural language description of an unknown content item, which lacks a content identifier;
vectorising the natural language description into a search vector comprising a set of text components and assigning a weight to each text component;
comparing the search vector to each metadata vector to generate a list of possible matches;
computing a score for each possible match based on vector similarities; and
filtering the list of possible matches based on the similarity score to determine if the search input has a match within the training inputs.

16. A content access and storage system comprising a store of metadata vectors in accordance with the method of claim 15, and a computer program which when executed by a processor performs the method steps of claim 15.

17. The method according to claim 1 further comprising:
storing a graph structure comprising a plurality of nodes, some nodes representing content items and some nodes representing text components, wherein the nodes are connected by links according to the adjusted weightings.

18. A method of generating matching metadata vectors for identifying content items in a store searchable by input vectors, the method comprising:
receiving multiple training inputs, each training input comprising a content identifier indicative of a content item, and at least one natural language description of the content item;
for each training input:
converting the natural language description into at least one text component;
generating at least one vector, each vector corresponding to one text component;
generating a set of component parts for each vector, each component part corresponding to a coordinate initialized with a random value;
adjusting each random coordinate based on the relationship of each component part to other vectors;
determining a weighting for each vector with respect to the item by determining that a vector does not provide a correct identification of content for a given set of weightings, and adjusting the weightings; and
defining a metadata vector for each item comprising the vectors containing the adjusted coordinates for that item and the weighting for each vector.

19. The method according to claim 18 further comprising:
storing a graph structure comprising a plurality of nodes, some nodes representing content items and some nodes representing text components, wherein the nodes are connected by links according to the adjusted weightings.

20. A method of generating matching metadata vectors for identifying content items in a store searchable by input vectors, the method comprising:
receiving multiple training inputs, each training input comprising a content identifier indicative of a content item, and at least one natural language description of the content item;
for each training input:
converting the natural language description into at least one text component;
generating at least one vector, each vector corresponding to one text component;
generating a set of component parts for each vector, each component part corresponding to a coordinate initialized with a random value;
adjusting each random coordinate based on the relationship of each component part to other vectors;
determining a weighting for each vector with respect to the item; and
defining a metadata vector for each item comprising the vectors containing the adjusted coordinates for that item and the weighting for each vector,
wherein the natural language description is held in the store in association with the content identifier to which it relates.

* * * * *